Patented Nov. 9, 1943

2,333,788

UNITED STATES PATENT OFFICE 2,333,788

REACTION OF SATURATED HYDROCARBONS WITH LIQUID SULPHUR DIOXIDE AND LIQUID CHLORINE OR BROMINE

George E. Holbrook, Wilmington, Del., Arthur L. Fox, Woodstown, N. J., and Arthur A. Baum and Willis J. Clem, Wilmington, Del., assignors to E. I. du Pont de Nemours & Company, Wilmington, Del., a corporation of Delaware No Drawing. Application June 27, 1940, Serial No. 342,796

4 Claims. (Cl. 204—163)

This invention relates to the preparation of organic sulphonyl halides. More particularly it relates to the preparation of organic sulphonyl chlorides and bromides by the simultaneous action of sulphur dioxide and chlorine or bromine on organic compounds containing at least one and preferably a plurality of methylene groups. Still more particularly it relates to a liquid phase process of the type described using liquid sulphur dioxide.

It is known that organic compounds, particularly saturated hydrocarbons can be converted to sulphonyl chlorides by reacting them with admixed sulphur dioxide and chlorine, especially in the presence of actinic light. A wide variety of compounds may be converted to sulphonyl chlorides in the manner stated.

This invention has for an object a new and practical method for preparing organic sulphonyl chlorides and bromides. A further object is to provide a process for the production of sulphonyl halides embodying the use of liquid sulphur dioxide and chlorine or bromine. It is a further object to provide a liquid phase process for making organic sulphonyl chlorides from normally gaseous and non-gaseous alkanes, liquid sulphur dioxide and liquid or gaseous chlorine. A further object is to provide a process of making sulphonyl halides from the above-named reactants with good yields. A further object is to provide a process of making di and poly sulphonyl halides from the above named reactants.

The above and other objects may be accomplished by the invention hereinafter described. In its broader aspects the invention comprises introducing or suspending an organic compound containing at least one and preferably at least three unsubstituted methylene groups in an open or closed chain in liquid sulphur dioxide, admixing a fluid halogen taken from the class consisting of chlorine and bromine. The reaction zone is preferably irradiated with actinic light. Any hydrocarbon or derivative thereof capable of reacting with a gaseous mixture of sulphur dioxide and chlorine to form sulphonyl chlorides may be reacted in accordance with this invention.

In one important aspect of the invention an organic compound containing a saturated aliphatic or cycloaliphatic hydrocarbon radical of at least 6 carbon atoms, especially a saturated aliphatic hydrocarbon or mixture of such is suspended in liquid sulphur dioxide and fluid chlorine is admixed or passed into the suspension.

In another important aspect of the invention a normally gaseous alkane is introduced into liquid sulphur dioxide and reacted with admixed fluid chlorine while irradiating the reaction zone with actinic light. In the case of the gaseous alkanes, e. g. methane the gas may be liquefied and run into the liquid sulphur dioxide bath which may also contain liquid chlorine or the gas may be passed into the reaction zone just described.

The reaction may be carried out at atmospheric or superatmospheric pressures. The temperature of the reaction zone regardless of the pressure chosen should be sufficiently low that liquid sulphur dioxide will remain in the reaction zone. When liquid chlorine is used as the additional reactant the temperature should be sufficiently low that both sulphur dioxide and liquid chlorine remain in the reaction zone. Higher temperatures may be used by increasing the pressure in the reaction zone so that the sulphur dioxide and preferably also the chlorine are liquid.

It has been found possible to prepare in good yields and in a high state of purity alkane sulphonyl chlorides of 1 to 4 carbon atoms by the above procedures. When used with higher alkanes and mixtures and petroleum oils and waxes it is possible to prepare hydrocarbon sulphonyl chlorides which are substantially free from chlorine attached to carbon. With such hydrocarbon materials containing at least 12 carbon atoms, it is possible to economically prepare sulphonyl chlorides which on hydrolysis yield sulphonic acids whose alkali metal salts possess exceptionally high detergency and wetting properties.

The actinic light used to promote or accelerate the reaction may vary widely in wave length and source. Wave lengths from 1800 to 7000 Å. appear to accelerate the reaction. Wave lengths from 3000 to 5800 Å. are very satisfactory. Suitable sources of light include incandescent lamps, ultraviolet lamps, mercury vapor arcs, rare gas lamps, carbon arcs, including metal and metal salt cored carbon arcs, diffused daylight, direct sunlight. Suitable wave lengths and sources are also disclosed in Calcott, Serial No. 336,435, filed May 21, 1940, and comprise low temperature mercury vapor fluorescent lamps which are designed to give very little visible light directly from the mercury arc, and emit as much energy as possible in the ultra violet region, specifically at 2537 Å. units. The emitted ultra violet radiation causes fluorescence in a chemical powder which is deposited on the walls of the tube, thus transforming the invisible ultra violet radiation into visible radiation. Some of the common phosphors (fluorescent chemicals) which may be used are listed in the table below, together with the color of the emitted light and peak of the radiation:

| Phosphor | General color | Emitted range Å | Emitted peak Å |
| --- | --- | --- | --- |
| Calcium tungstate | Blue | 3,800–7,000 | 4,400 |
| Magnesium tungstate | Blue-white | 3,800–7,200 | 4,800 |
| Zinc silicate | Green | 4,500–6,200 | 5,250 |
| Zinc beryllium silicate | Yellow-white | 4,500–7,200 | 5,950 |
| Cadmium silicate | Yellow-pink | 4,300–7,200 | 5,950 |
| Cadmium borate | Pink | 4,000–7,200 | 6,150 |

In addition to the phosphors, activators such as manganese may be added. Instead of the single phosphors mentioned above which emit the greater part of their radiation in a relatively narrow band, mixtures may be used to obtain wider bands of radiation. Whereas, for example, one fluorescent lamp may emit the majority of its radiation between about 4000 and 5800 Å., another may be largely between 4800 and 5800 Å. Still another may emit radiation from 3800 to 7400 or 7600 Å. with a sustained peak or plateau of radiation from 4400 to 6200 Å. Thus it is readily apparent that the low temperature mercury vapor lamps may be made to emit any desired range of radiation.

Agitation of the reaction zone in many instances is particularly desirable to insure a uniformity of product and against local overheating. This is especially true when the higher hydrocarbons solidify or tend to solidify or crystallize at the temperature and pressure used.

The invention will now be further illustrated but is not intended to be limited by the following examples wherein the parts stated are by weight:

Example I

Twenty parts of liquid sulphur dioxide was mixed at about −20° C. with 3 parts of liquid bromine and to this mixture was added 5 parts of a light paraffin oil marketed under the trademark "Marcol" with stirring. A 60 watt tungsten filament light was placed close to the reaction container. Hydrobromic acid was given off in quantity and after standing some time the sulphur dioxide and bromine were allowed to evaporate. The residual reaction mass on hydrolysis with strong caustic gave a product which was very surface active.

Example II

Five hundred seventy-six parts of liquid sulphur dioxide and 213 parts of liquid chlorine were mixed at −40° in a reaction vessel which was maintained at this temperature by means of a solid carbon dioxide acetone bath. To this was gradually added 258 parts of N-hexane. The reaction mass was stirred for 6 hours in the presence of actinic light while maintaining the temperature at about −40° C., and then aerated with nitrogen and allowed to come to room temperature. During the reaction the product stayed light colored but on rising to room temperature considerable color developed. The entire mass was hydrolyzed and neutralized with about 479 of 10N sodium hydroxide. It was then diluted with water to 2000 parts and after standing the dark aqueous layer was drawn off and the upper oily layer extracted twice with water and the extracts added to the original aqueous layer. The aqueous layer was drum dried and 413 parts of the product was obtained. This on analysis contained 31.31% sodium chloride, 3.45% sodium sulphate and 65.2% sodium hexane sulphonates.

Example III

Seven hundred and sixty-eight parts of liquid sulphur dioxide and 426 parts of liquid chlorine were mixed at about −40° and to this was added 348 parts of butane. The reaction mass was stirred while the reaction zone was illuminated from a 500 watt tungsten filament incandescent bulb at −40° for 6 hours and then allowed to rise to room temperature. The yield of crude material was 575 parts. This was vacuum distilled and separated in three fractions as follows:

| | Sulphur | Chlorine | Weight parts |
| --- | --- | --- | --- |
| Fraction A—up to 60° C. at 3 mm | 16.46 | 29.15 | 28 |
| Fraction B—60–70° C. at 3 mm | 19.76 | 23.78 | 339 |
| Fraction C—70–110° C. at 3 mm | 17.44 | 33.89 | 49 |

In a solid carbon dioxide trap there was obtained 67 parts of distillate which was redistilled at normal pressure and shown to be primarily butyl chloride and butane dichloride.

Example IV

One hundred forty-two parts of chlorine were mixed with 400 parts of sulphur dioxide at −40° while subjecting the reaction zone to irradiations from a 500 watt tungsten filament light bulb. To this was gradually added 450 parts of a refined paraffin base No. 40 white oil having an average molecular weight of 225, and the following characteristics:

| | |
| --- | --- |
| Initial boiling point (A. S. T. M.) ° C | 266 |
| Dry point do | 312 |
| Saybolt Universal viscosity, 100° F secs | 36.5 |
| Specific gravity 15.5/15.5° C | 0.8036 |
| Refractive index 20° C | 1.4423 |

The white oil solidified as quickly as it hit the reaction zone but formed a mush that stirred easily. The reaction mass was maintained at −40° for 5 hours and was very white in color. The sulphur dioxide and chlorine were then allowed to evaporate and the weight of the residue was 556 parts. 400 parts of this was hydrolyzed requiring 135 parts of sodium hydroxide. The hydrolysis mass was diluted to 2000 parts using 500 parts alcohol and the rest water. The unreacted oil was separated off and the aqueous portion drum dried. The yield of drum dried material was 186 parts. This contained 16.4% sodium chloride, 7.84% sodium sulphate and 65.6% active ingredient. This material showed exceptional soft and hard water detergency and gave wetting by the Clarkson-Draves method at 0.59 part active ingredient per liter.

Example V

Seventy-five parts of cetane was mixed with 25 parts of liquid chlorine and 78½ parts of liquid sulphur dioxide and the mixture placed in an iron bomb which was cooled in a solid carbon dioxide bath. After sealing, it was heated to 70° C. for 4 hours and again cooled in a solid carbon dioxide bath and opened. There was very little pressure and the contents were mostly solid consisting of a white solid and a black solid. In warming up to 80° C. the white solid melted and the black solid was filtered off. Solid weight 1 part, filtrate 80 parts. There was no odor of sulphuryl chloride at any time after opening the bomb. The filtrate from the solid was heated on a steam bath for 6 hours under vacuum to remove any adhering sulphur dioxide. Yield 68 parts. Analysis: chlorine 3% and sulphur 0.6%.

Example VI

Two hundred fifty-six parts of liquid sulphur dioxide and 142 parts liquid chlorine were placed in a container illuminated by a tungsten filament electric lamp. Two hundred twenty-eight parts of iso-octane was added with stirring to this reaction mass over a period of two hours maintaining the temperature at −40 to −42° C. After the iso-octane had all been introduced, the reaction mass was stirred at this temperature for one hour and then allowed to come up to room temperature slowly. When room temperature had been reached the light was removed and the product was almost white in color. When residual dissolved gases were removed under vacuum, the product weighed 256 parts. Analysis: sulphur 9.71%, total chlorine 24.48%, hydrolyzable chlorine 13.43%.

Example VII

Two hundred fifty-six parts of liquid sulphur dioxide and 228 parts iso-octane were mixed and the reaction zone illuminated with actinic light. Two phases were formed which mixed well on stirring. The temperature was maintained at −40° C. by means of external cooling and 145 parts of gaseous chlorine was bubbled through the reaction flask slowly. After this much chlorine had been passed into the reaction mass the stirring was continued for 30 minutes and the yellow green color that the mass assumed during the reaction had disappeared and the material was entirely homogeneous and water white. The product was allowed to come to room temperature and was heated to 50–55° under vacuum to remove the dissolved gases. The yield of crude material was 295 parts or 69.1% of theory. Analysis: sulphur 12.51%, chlorine 21.31%, hydrolyzable chlorine 15.29%.

Example VIII

Two hundred fifty-six parts liquid sulphur dioxide and 142 parts of liquid chlorine were mixed and cooled to −60°. To this was added in the presence of actinic light, 88 g. propane. These were stirred at −60° for four hours and then the temperature was allowed to rise to +15°. The product was heated under vacuum at 80° C. to remove volatile material. The residue remaining after the evacuation comprised propane sulphonyl chloride.

In place of the specific hydrocarbons of the above examples may be substituted other materials capable of forming organic sulphonyl bromides and chlorides by a reaction with admixed gaseous sulphur dioxide and gaseous chlorine or bromine. Suitable reactants are disclosed in U. S. Patents 2,046,090, 2,174,492, 2,174,505, 2,174,506, 2,174,507, 2,174,508, 2,174,509, 2,197,800, 2,202,791. Thus suitable specific compounds include methane, ethane, propane, the normal liquid and easily liquefiable n-alkanes, e. g., n-pentane, n-hexane, n-heptane, n-octane, n-nonane, n-decane, n-dodecane, n-tetradecane, n-pentadecane, n-hexadecane, n-octadecane, etc., iso-alkanes, e. g., iso-decane, iso-pentadecane (made by hydrogenating tri-isoamylene), iso-octane (obtained by hydrogenating di-isobutylene), etc., mineral oils, particularly refined fractions such as white oil, paraffin wax, etc., naphthenes, e. g., fractions containing an average of 12 carbon atoms per molecule, 15 carbon atoms per molecule, 18 carbon atoms per molecule, etc., decahydronaphthalene, cyclohexane, menthane, camphane, pinane, abietane, dodecylcyclohexane, isopropylmenthane, etc.

Various halogen and other derivatives of the above-mentioned compounds may also be used, e. g., chloro-n-alkanes, chloro-isoalkanes, chloromenthane, chlorodecahydronaphthalene, hydroxycamphane, hydroxyabietane, hydroxycamphane, methyl cyclohexanol, N-diathyl cyclohexylamine, cyclohexane monosulphonyl chloride, etc. It may be used with alcohols, ethers, ketones, carboxylic acids, esters, amides, sulphones, sulphonic acids, etc., which are preferably of high molecular weight, that is, contain at least eight carbon atoms. As specific examples of such compounds, mention is made of dodecyl, tetradecyl, hexadecyl, and octadecyl alcohols, diethylheptyl, carbinol, diethyltridecanol-6, tridecanone-8, heptadecanone-8, nonadecanone-9, pentadecanone-6, stearic, lauric, myristic, palmitic, decanoic, and erucic acids, methyl stearate, ethyl palmitate, methyl laurate, lard, olive oil, alkyl benzenes and napthalenes, wherein the alkyl groups correspond to those contained in the above-mentioned hydrocarbons especially the alkanes.

The sulphonyl halides formed may be converted into sulphonic acids and salts, sulphonamides, esters and various other chemical compounds. A number of uses are described in the above listed patents.

The proportions of reactants may be varied considerably. In general it is desirable to have at least one molecule of sulphur dioxide per molecule of chlorine or bromine. Proportions of 1 to 20 mols of sulphur dioxide per mol of chlorine or bromine represent a practical range. The proportion of $SO_2$ to hydrocarbon may vary also, e. g. from about a 1:1 molar ratio to 20:1 or even higher molar ratio. The length of the reaction may be varied quite widely.

This reaction may be carried out over a very wide temperature and pressure range. Sulphur dioxide solidifies at −72.7° C. but temperatures below this point, e. g., down to −100° C. and below may be employed if the chlorine and sulphur dioxide are mixed prior to cooling. When temperatures above the boiling point of sulphur dioxide and chlorine at atmospheric pressure are used, then superatmospheric pressures must be resorted to in order to keep one or both of the inorganic reactants liquid. Thus, if the reaction is carried out at 110° C. pressures of 35–50 atmospheres may be expected. If working under pressure a means must be provided for venting the hydrochloric acid gas formed in the reaction.

This invention has the advantage that it enables one to prepare sulphonyl chlorides and bromides by a carefully controlled process. A further advantage is that it enables one to prepare hydrocarbon sulphonyl chlorides in a high state of purity. A further advantage resides in the fact that the reaction produces easily removable by-products. A major advantage resides in that it gives higher yields with lower alkanes than are obtained by a vapor phase reaction.

As many apparently widely different embodiments of this invention may be made without departing from the spirit and scope thereof, it is to be understood that we do not limit ourselves to the specific embodiments herein except as defined by the appended claims.

We claim:

1. The process of making hydrocarbon sulphonyl chlorides which comprises reacting in the liquid phase an alkane of 1 to 5 carbon atoms with admixed liquid chlorine and liquid sulphur dioxide while irradiating the same with actinic light containing wave lengths from 3000 to 5800 A. at a temperature from —20° to —100° C.

2. The process of making hydrocarbon sulphonyl chlorides which comprises reacting an alkane of at least 12 carbon atoms with admixed liquid sulphur dioxide and liquid chlorine while irradiating the reaction zone with actinic light containing wave lengths from 3000 to 5800 A. at a temperature from —20° to —100° C.

3. The process of producing organic sulphonyl chlorides which comprises reacting a hydrocarbon compound containing a saturated hydrocarbon radical with chlorine and sulphur dioxide substantially simultaneously by carrying out said reaction in a body of liquid sulphur dioxide while irradiating the reaction zone with actinic light at a temperature between —20° to —100° C.

4. The process of preparing hydrocarbon sulphonyl chlorides which comprises reacting a saturated hydrocarbon taken from the group consisting of aliphatic and cycloaliphatic hydrocarbons with liquid chlorine and liquid sulphur dioxide substantially simultaneously by carrying out said reaction in a body of liquid sulphur dioxide while irradiating the reaction zone with actinic light at a temperature from —20° to —100° C.

GEORGE E. HOLBROOK.
ARTHUR L. FOX.
ARTHUR A. BAUM.
WILLIS J. CLEM.